United States Patent [19]

Sakaguchi et al.

[11] Patent Number: 5,416,263
[45] Date of Patent: May 16, 1995

[54] PROCESS FOR PRODUCING 4,4'-DIAMINO-1,1'-DIANTHRAQUINONYL PIGMENTS

[75] Inventors: Iwao Sakaguchi, Hyogo; Katsutoshi Numano, Osaka; Toshiaki Kishimoto, Osaka; Hiroki Inoue, Osaka; Yoshiaki Hayashi, Osaka; Keisuke Ito, Osaka, all of Japan

[73] Assignee: Sumitomo Chemical Co., Ltd., Osaka, Japan

[21] Appl. No.: 58,711

[22] Filed: May 10, 1993
(Under 37 CFR 1.47)

Related U.S. Application Data

[63] Continuation-in-part of Ser. No. 799,952, Nov. 29, 1991, abandoned, which is a continuation-in-part of Ser. No. 984,472, Dec. 2, 1992, abandoned.

[30] Foreign Application Priority Data

| Nov. 30, 1990 | [JP] | Japan | 2-339066 |
| Dec. 12, 1991 | [JP] | Japan | 3-328765 |

[51] Int. Cl.$^6$ ............................................. C08K 5/17
[52] U.S. Cl. ..................................... 552/212; 106/493
[58] Field of Search ......................... 552/212; 106/493

[56] References Cited

U.S. PATENT DOCUMENTS

| 3,228,780 | 1/1966 | Grelat . |
| 4,969,954 | 11/1990 | Schutze et al. . |
| 5,078,794 | 1/1992 | Schutze et al. . |

FOREIGN PATENT DOCUMENTS

| 0075182 | 3/1983 | European Pat. Off. ............ 106/493 |
| 3800683 | 12/1988 | Germany . |
| 38-25842 | 4/1961 | Japan . |
| 56-143255 | of 1981 | Japan . |
| 63-312366 | 12/1988 | Japan . |
| 1521747 | 11/1989 | U.S.S.R. ................................ 106/493 |

*Primary Examiner*—Howard T. Mars
*Assistant Examiner*—Rebecca Cook
*Attorney, Agent, or Firm*—Cushman Darby & Cushman

[57] ABSTRACT 4,4'-Diamino-1,1'-dianthraquinonyl compounds which are obtained in a known manner and which are easy to agglomerate or aggregate owing mainly to their too fine particle size are conditioned by heating an aqueous suspension consisting essentially of the 4,4'-diamino-1,1'-dianthraquinonyl compound and water in the presence or absence of a mineral acid or an alkali. The thus obtained 4,4'-diamino-1,1'-dianthraquinonyl pigments are used in paints, printing inks, coloring of plastics and the like. The aqueous suspension is preferably prepared by desulfonating a 4,4'-diamino-1,1'-dianthraquinonyl-3,3'-disulfonic acid compound in a mineral acid such as sulfuric acid and then mixing the desulfonation reaction mixture with water or by once isolating the resulting 4,4'-diamino-1,1'-dianthraquinonyl compound and mixing the isolated compound with water.

12 Claims, No Drawings

PROCESS FOR PRODUCING 4,4′-DIAMINO-1,1′-DIANTHRAQUINONYL PIGMENTS

This is a continuation-in-part application of both Ser. No. 07/799,952, filed on Nov. 29, 1991, abandoned and Ser. No. 07/984,472, filed on Dec. 2, 1992, abandoned the complete disclosures of which are incorporated herein by reference.

The present invention relates to a process for producing 4,4′-diamino-1,1′-dianthraquinonyl red pigments which are useful in such fields as paints, printing inks and plastics.

4,4′-Diamino-1,1′-dianthraquinonyl pigments are obtained by desulfonation of 4,4′-diamino-1,1′-dianthraquinonyl-3,3′-disulfonic acids in mineral acids such as sulfuric acid as disclosed in JP-B-38-25842 and its counterpart, United Kingdom Patent No. 926,514. In more detail, these pigments are obtained by adding to water the reaction mixture obtained by the desulfonation whereby crystals precipitate out, collecting the precipitated crystals by filtration, and then washing the crystals with an aqueous alkali solution or water to remove the sulfuric acid deposited on and adhering to the crystals. However, the 4,4′-diamino-1,1′-dianthraquinonyl pigments produced in that manner have particle sizes so fine that they are apt to strongly and readily agglomerate or aggregate. As a consequence, these conventionally produced pigments have inferior pigment properties and are therefore hardly used as pigments.

In an effort to improve pigment properties conventionally produced pigments must generally be subjected to a further conditioning treatment.

The conditioning method as proposed in JP-A-63-312366, U.S. Pat. Nos. 4,969,954 and 5,028,794 uses various organic liquids. In more detail, the desulfonation reaction mixture obtained, for example, by the method described in the aforementioned JP-B-38-25842 and United Kingdom Patent No. 926,514, is mixed with water to form 4,4′-diamino-1,1′-dianthraquinonyl sulfate. The sulfate once isolated is hydrolyzed, if necessary by dissolving it in sulfuric acid and adding the solution to water. The thus produced 4,4′-diamino-1,1′-dianthraguinonyl pigments are isolated and subjected to a solvent treatment with organic liquids such as aliphatic alcohols, esters of aliphatic and aromatic carboxylic acids, formamides, amines, substituted aromatic hydrocarbons and unsubstituted aromatic hydrocarbons. The large amounts of organic liquids required in this conventional conditioning method necessitate additional subsequent steps to recover or remove of the organic liquids by either distillation or hydrolysis and conversion of the organic liquids to water-soluble forms. These additional steps are troublesome. Furthermore, this process creates a waste water disposal problem. Consequently this conventional conditioning process is not advantageous from an industrial point of view.

The present inventors have undertaken extensive studies to find an industrially advantageous process of conditioning, and as a result attained the present invention.

In the present specification, the term "4,4′-diamino-1,1′-dianthraquinonyl compounds" is intended to mean those which are obtained by known processes, such as, for example, those described in JP-B-38-25842 and United Kingdom Patent No. 926,514, and which are apt to readily agglomerate or aggregate owing mainly to their too fine particle size, and which are therefore inferior in pigment properties.

The present invention provides a process for producing a 4,4′-diamino-1,1′-dianthraquinonyl pigments by conditioning a 4,4′-diamino-1,1′-dianthraquinonyl compound which is readily agglomerated or aggregated mainly due to a too fine particle size, which comprises heating an aqueous suspension consisting essentially of the 4,4′-diamino-1,1′-dianthraquinonyl compound and water in the presence or absence of a mineral acid or an alkali.

According to the process of the present invention, a conventionally available 4,4′-diamino-1,1′-dianthraquinonyl compound can be effectively conditioned in an industrially advantageous manner with use of substantially no organic liquid to obtain non-agglomerating and industrially useful pigments. The conditioned 4,4′-diamino-1,1′-dianthraquinonyl pigments obtainable by the present process have superior pigment characteristics such as dispersibility, flowability, hiding power, tinting strength, vividness and transparency, and are therefore quite useful as pigments for paints, printing inks, coloring of plastics and others.

The process of the present invention is explained in detail as follows.

The 4,4′-diamino-1,1′-dianthraquinonyl compound (hereinafter referred to as dianthraquinonyl compound for brevity) in fine particulate form to be used in the present invention is readily obtained by known processes, such as, for example, those described in JP-B-38-25842 and United Kingdom 926,514. For example, the dianthraquinonyl compound can be obtained by heating 1-amino-4-bromoanthraquinone-2-sulfonic acid with metallic copper powder or a copper compound in an acidic medium to obtain 4,4′-diamino-1,1′-dianthraquinonyl-3,3′-disulfonic acid, heating it with a mineral acid or a salt which shows acidity in its aqueous solution at a temperature of 120° to 220° C. to effect desulfonation of the 4,4′-diamino-1,1′-dianthraquinonyl-3,3′-disulfonic acid, and then mixing the desulfonation reaction mixture with water. The mineral acid includes sulfuric acid, preferably 80 to 90% sulfuric acid, and the salts includes sodium hydrogensulfate. Preferably the 4,4′-diamino-1,1′-dianthraquinonyl-3,3′-disulfonic acid compound is purified by a known process such as treatment with active carbon, re-dissolution and re-precipitation, before desulforation of the described dianthraquinonyl.

The aqueous suspension to be subjected to the conditioning process of the present invention which contains the dianthraquinonyl compound and water can be prepared by mixing the reaction mixture from the above-mentioned desulfonation reaction with water. In the present process, the mixing of the desulfonation reaction mixture and water is preferably carried out by pouring or discharging the desulfonation reaction mixture into water, or, if desired, by adding water, such as dropwise, to the desulfonation reaction mixture. In either case, the water temperature can be controlled within a range of from 0° C. to 100° C. In order to obtain pigments of high transparency, the temperature preferably ranges from 0° C. to 30° C., and more preferably ranges from 0° C. to 10° C. In order to obtain pigments exhibiting excellent flowability, the temperature preferably ranges from 30° C. to 60° C., and more preferably ranges from 35° to 55° C.

In cases where the desulfonation reaction mixture is mixed with water, and when sulfuric acid is used as the mineral acid, the concentration of sulfuric acid in the aqueous suspension is preferably 50% by weight or less, although 30 to 10% by weight is more preferred.

Alternatively, the aqueous suspension can be prepared by first once isolating the dianthraquinonyl compound from the desulfonation reaction mixture by a known process and then mixing the isolated compound with water. Isolation of the dianthraquinonyl compound can be carried out by a known processes, for example, by mixing the desulfonation reaction mixture with water to prepare an aqueous suspension, collecting the compound by filtration and then washing the collected compound.

The concentration of the dianthraquinonyl compound in the aqueous suspension to be subjected to the present conditioning treatment is not particularly limited, but usually ranges from about 1 to about 15% by weight. More specifically, the concentration preferably ranges from about 1 to about 5% by weight when the preparation of the aqueous suspension is carried out by mixing the desulfonation reaction mixture with water, and preferably about 5 to about 15% by weight, when the preparation is carried out by mixing the isolated dianthraquinonyl compound with water.

In the process of the present invention, surfactants may be used in the mixing of the desulfonation reaction mixture with water. The surfactants can be nonionic, cationic, anionic or amphoteric. The surfactants can be previously dissolved or dispersed in the water which is to be mixed with the desulfonation reaction mixture. Alternatively, when the selected surfactants are stable in mineral acids such as sulfuric acid, they can be added during or immediately after the desulfonation reaction.

The thus prepared aqueous suspension is then subjected to heating preferably as it is. If desired, the aqueous suspension may be adjusted in advance to a desired pH value such as 12 or less, more specifically 4 to 10, using an alkali such as sodium hydroxide.

Alternatively, in order to obtain pigments of high transparency, an alkali may be mixed with the aqueous suspension in an amount of 1 to 20% by weight, preferably 2 to 10% by weight, based on the weight of water in the aqueous suspension. When the aqueous suspension before the alkali is mixed is acidic, for example, when the aqueous suspension is prepared by mixing the desulfonation reaction mixture with water, the acid is first neutralized with an alkali. Thereafter, an amount of alkali is mixed to adjust the alkali concentration to the desired value. According to this method, the heat of neutralization can be effectively utilized to save energy for the successive heat treatment.

Useful suitable sources of alkali include hydroxides and carbonates of alkali metals and ammonia. Suitable hydroxides and carbonates include sodium hydroxide, potassium hydroxide, lithium hydroxide, sodium carbonate, potassium carbonate and lithium carbonate, although sodium hydroxide, potassium hydroxide and mixtures thereof are preferred.

If desired, a small amount of an organic liquid may be added to the aqueous suspension in order to lower the heating temperature, shorten the heating time or enable the heating to be carried out even under atmospheric pressure. In this case, the aqueous suspension is usually controlled to a pH ranging from 4 to 10 depending on the stability or organic liquid to be used.

Examples of the organic liquid are optionally substituted aromatic hydrocarbons such as benzene, toluene, xylene, chlorobenzene and nitrobenzene, aliphatic alcohols such as methanol, ethanol, propanol, hexanol, ethylene glycol, ethylcellosolve and butylcellosolve, aliphatic or aromatic carboxylic acid esters such as ethyl formate, ethyl acetate, butyl acetate, ethyl propionate, methyl benzoate, dimethyl phthalate and methyl salicylate, ketones such as acetone, methyl ethyl ketone, methyl isobutyl ketone and cyclohexanone, amides such as formamide, N,N-dimethylformamide, N-methylacetamide and N,N-dimethylacetamide, and aliphatic or aromatic amines such as diethylamine, triethylamine, butylamine, ethanolamine, pyridine, aniline and N,N-diethylaniline. These organic liquids can be used each alone or a mixture of two or more. Of these, preferred are isobutyl alcohol, methyl isobutyl ketone, butyl acetate and a mixture thereof.

The organic liquid may be used in an amount of less than 5% by weight based on the weight of the dianthraquinonyl compound. Any amount greater than 5% by weight makes the process of the present invention troublesome from an environmental standpoint. Pollution of waste water then becomes quite remarkable and is industrially undesirable.

The heat treatment of the aqueous suspension can be carried out under atmospheric or increased pressure. The heat treatment is conducted at a temperature which is preferably within a range of 50° to 120° C., more preferably 60° to 100° C. The heating is usually conducted for a period of time within a range of 1 to 20 hours, although in practice it may be possible to complete the heating within about 2 to 8 hours.

After completing the heat treatment, the mixture can be subjected to after treatments, if desired, such as isolation by filtration, washing and drying, to work-up the conditioned 4,4'-diamino-1,1'-dianthraquinonyl pigments. The resulting 4,4'-diamino-1,1'-dianthraquinonyl pigments can be surface treated with resins or resinous materials in a conventional manner.

According to the process of the present invention, conditioned 4,4'-diamino-1,1'-dianthraquinonyl pigments having improved important pigment properties such as dispersibility, flowability, hiding power, tinting strength, vividness, and transparency can be produced on an industrial scale. The conditioned pigments produced according to the present process are useful as colorants for coatings and resins.

The present invention is further described in the following non-limiting examples. In these examples, "part" and "%" are by weight.

EXAMPLE 1

Disodium 4,4'-diamino-1,1'-dianthraquinonyl-3,3'-disulfonate (45 parts) prepared by the process described in Example 1 of JP-B-38-25842 was heated in 85% sulfuric acid (450 parts) at a temperature of 150° to 155° C. for 5 hours to perform desulfonation. The reaction mixture was added to water (500 parts). The addition was carried out with simultaneous addition of ice (400 parts) so that temperature of water was kept at a temperature of 0° to 10° C. The concentration of sulfuric acid was 28.3%. Thus, an aqueous suspension containing 4,4'-diamino-1,1'-dianthraquinonyl was prepared.

The resulting aqueous suspension was heated at 80° to 85° C. for 5 hours, and thereafter subjected to filtration, washed with water until it became neutral, and then dried at 80° to 85° C. to obtain the desired 4,4'-diamino-1,1'-dianthraquinonyl pigment (29 parts).

The obtained pigment showed higher tinting strength in coloration of polyvinyl chloride resin as compared with the compound which was not subjected to the above conditioning procedure.

EXAMPLE 2

A 4,4'-diamino-1,1'-dianthraquinonyl aqueous suspension obtained by desulfonation and dilution with water was obtained in the same manner as in Example 1 and was heated at 100° to 102° C. for 11 hours. The suspension was cooled to 80° C. and subjected to the same after-treatment as in Example 1 to obtain 4,4'-diamino-1,1'-dianthraquinonyl pigment (29 parts).

An aminoalkyd paint prepared using the resulting pigment was superior in hiding power and flowability compared to an aminoalkyd paint prepared using the compound which was not subjected to the above conditioning procedure.

EXAMPLE 3

4,4'-Diamino-1,1'-dianthraquinonyl was filtered off from the aqueous suspension obtained by desulfonation and dilution with water in the same manner as in Example 1 and washed with water (500 parts). The resulting cake (145 parts) was mixed with water (620 parts) and 28% sodium hydroxide solution (2 parts) was added thereto to adjust pH to 10, followed by heating at 98° to 100° C. for 12 hours and then cooling to 80° C. After filtration, the residue was washed with water until it became neutral and dried to obtain 4,4'-diamino-1,1'-dianthraquinonyl pigment (28 parts).

EXAMPLE 4

Example 3 was repeated to obtain the aqueous suspension of pH 10. Isobutyl alcohol (1 part) was added thereto, and the mixture was heated at 60° to 65° C. for 5 hours, and then followed by filtration. The precipitate collected on a filter was after-treated in the same manner as in Example 3 to obtain 4,4'-diamino-1,1'-dianthraquinonyl pigment (28 parts).

EXAMPLE 5

Using butyl acetate in place of isobutyl alcohol, Example 4 was repeated to obtain 4,4'-diamino-1,1'-dianthraquinonyl pigment (28 parts).

EXAMPLE 6

A desulfonation reaction mixture was obtained in the same manner as in Example 1 and was added to water (980 parts) of 45° C. with simultaneous addition of ice (200 parts) so that temperature of the water was kept at 45° to 50° C. The concentration of sulfuric acid was 23.5%. The resulting aqueous suspension was heated at 85° to 90° C. for 3 hours and then after-treated in the same manner as in Example 1 to obtain 4,4'-diamino-1,1'-dianthraquinonyl pigment (29 parts).

EXAMPLE 7

An aqueous suspension of the 4,4'-diamino-1,1'-dianthraquinonyl compound was obtained by desulfonation and dilution with water in the same manner as in Example 6 and was subjected to filtration. The resulting cake (145 parts) was stirred in water (480 parts). The concentration of sulfuric acid was 4.6%. The aqueous suspension was then heated at 95° to 98° C. for 8 hours and after-treated in the same manner as in Example 1 to obtain 4,4'-diamino-1,1'-dianthraquinonyl pigment (28 parts).

EXAMPLE 8

To a 4.6% sulfuric acid suspension of 4,4'-diamino-1,1'-dianthraquinonyl which was obtained in the same manner as in Example 7 was added 28% sodium hydroxide (81 parts) to adjust pH to 8 and the suspension was heated in an autoclave at 110° to 115° C. for 2 hours. The suspension was after-treated in the same manner as in Example 7 to obtain 4,4'-diamino-1,1'-dianthraquinonyl pigment (28 parts).

EXAMPLE 9

Example 8 was repeated to obtain an aqueous suspension of pH 8. Methyl isobutyl ketone (0.5 part) was added thereto, and the mixture was heated at 80° to 85° C. for 2 hours. The resulting mixture was after-treated in the same manner as in Example 8 to obtain 4,4'-diamino-1,1'-dianthraquinonyl pigment (28 parts).

EXAMPLE 10

Example 6 was repeated to obtain an aqueous suspension of 4,4'-diamino-1,1'-dianthraquinonyl, and the precipitate was collected on a filter, and washed with water until the filtrate was made neutral. The cake (145 parts) was mixed with water (700 parts) to form an aqueous suspension. The aqueous suspension was found to have a pH of 7.1. That aqueous suspension was heated at 95° to 98° C. for 8 hours. The resulting mixture was after-treated in the same manner as in Example 1 to obtain 4,4'-diamino-1,1'-dianthraquinonyl pigment (28 parts).

EXAMPLE 11

Example 10 was repeated to obtain an aqueous suspension of pH 7.1. Isobutyl alcohol (0.5 part) and methyl isobutyl ketone (0.5 part) were added thereto, and the mixture was heated at 65° to 70° C. for 3 hours. The resulting mixture was after-treated in the same manner as in Example 1 to obtain 4,4'-diamino-1,1'-dianthraquinonyl pigment (28 parts).

EXAMPLE 12

Example 10 was repeated to obtain a cake (145 parts), which was then mixed with water (80 parts) to form an aqueous suspension of pH 7.1. The aqueous suspension was heated at 95° to 98° C. for 8 hours, and then after-treated in the same manner as in Example 10 to obtain 4,4'-diamino-1,1'-dianthraquinonyl pigment (28 parts).

EXAMPLE 13

Disodium 4,4'-diamino-1,1'-dianthraquinonyl-3,3'-disulfonate (45 parts) prepared by the process mentioned in Example 1 of JP-B-38-25842 was heated in 85% sulfuric acid (450 parts) at 150° to 155° C. for 5 hours to effect desulfonation. Then the reaction mixture was poured into water (500 parts), while adding ice (400 parts) to keep a temperature of water between 0° and 10° C. Then, 28% sodium hydroxide solution (1115 parts) was slowly added thereto to make the suspension neutral. At this time, the temperature rose to 40° C.

To the resulting aqueous suspension was added 28% sodium hydroxide solution (400 parts) and the suspension was heated at 80° to 85° C. for 5 hours. Thereafter, after-treatments, including filtration, washing with water to make it neutral and drying at 80° to 85° C., gave 4,4'-diamino-1,1'-dianthraquinonyl pigment (29 parts).

In coloration of polyvinyl chloride resin, the resulting pigment had higher tinting strength than the compound which was not subjected to the above conditioning treatment.

EXAMPLE 14

An aqueous suspension of 4,4'-diamino-1,1'-dianthraquinonyl obtained by desulfonation, dilution with water, neutralization and addition of alkali in the same manner as in Example 13 was heated at 100° to 102° C. for 11 hours. The suspension was cooled to 80° C. and subjected to the same after-treatments as in Example 1 to obtain 4,4'-diamino-1,1'-dianthraquinonyl pigment (29 parts).

An aminoalkyd paint prepared using the resulting conditioned pigment was higher in hiding power, flowability and vividness than a like aminoalkyd paint prepared using the compound which was not subjected to the above conditioning treatment.

EXAMPLE 15

4,4'-Diamino-1,1'-dianthraquinonyl was collected by filtration from an aqueous suspension prepared by desulfonation and dilution with water in the same manner as in Example 1, and washed with water until the washed water was made neutral. The resulting cake (145 parts) was stirred in water (50 parts) and 45% potassium hydroxide solution (12 parts) was added, followed by heating at 98° to 102° C. for 12 hours. After cooling the suspension to 80° C., the same after-treatments as in Example 13 gave 4,4'-diamino-1,1'-dianthraquinonyl pigment (28 parts).

EXAMPLE 16

A desulfonation reaction mixture was obtained in the same manner as in Example 13 and was added to water (980 parts, 45° C.), while adding ice (200 parts) to keep a temperature of water between 45° and 50° C.

Then, 28% sodium hydroxide solution (1115 parts) was slowly added thereto to make the suspension neutral. At this time, the temperature rose to 80° C. Then, to the suspension was added sodium hydroxide (100 parts) and the suspension was heated at 80° to 85° C. for 3 hours, followed by the same after-treatments as in Example 13 to obtain 4,4'-diamino-1,1'-dianthraquinonyl pigment (29 parts).

EXAMPLE 17

Example 16 was repeated, except that potassium hydroxide (130 parts) was used instead of the sodium hydroxide (100 parts) used after the neutralization of the suspension, thereby obtaining 4,4'-diamino-1,1'-dianthraquinonyl pigment (29 parts).

EXAMPLE 18

An acidic aqueous suspension was prepared by desulfonation and dilution with water in the same manner as in Example 16, 4,4'-diamino-1,1'-dianthraquinonyl was collected therefrom by filtration and washed with water until the washed water was made neutral. The resulting cake (145 parts) was stirred in water (300 parts) and 45% sodium hydroxide solution (90 parts) was added, followed by heating in an autoclave at 110° to 115° C. for 3 hours. After cooling to 80° C., the thus obtained product was subjected to the same after-treatments as in Example 13 to yield 4,4'-diamino-1,1'-dianthraquinonyl pigment (28 parts).

What is claimed is:

1. A process for producing a 4,4'-diamino-1,1,-dianthraquinonyl pigment by conditioning a 4,4'-diamino-1,1'-dianthraquinonyl compound having such fine particle size that the particles can readily agglomerate or aggregate, which comprises heating an aqueous suspension consisting essentially of the 4,4,-diamino-1,1'-dianthraquinonyl compound and water in the presence or absence of a mineral acid or an inorganic alkali.

2. A process according to claim 1, wherein the aqueous suspension is prepared by desulfonating a 4,4'-diamino-1,1'-dianthraquinonyl-3,3'-disulfonic acid compound in a mineral acid and then mixing the desulfonation reaction mixture with water.

3. A process according to claim 2, wherein the mineral acid is sulfuric acid.

4. A process according to claim 3, wherein concentration of sulfuric acid in the aqueous suspension is 50% by weight or less.

5. A process according to claim 1, wherein the aqueous suspension is prepared by desulfonating a 4,4'-diamino-1,1'-dianthraquinonyl-3,3'-disulfonic acid compound in a mineral acid, isolating the resulting 4,4'-diamino-1,1'-dianthraquinonyl compound and mixing the isolated compound with water.

6. A process according to claim 1, wherein pH of the aqueous suspension is 12 or less.

7. A process according to claim 6, wherein the pH ranges from 4 to 10.

8. A process according to claim 1, wherein the heating is carried out at a temperature of 50° to 120° C.

9. A process according to claim 1, wherein the concentration of the 4,4'-diamino-1,1'-dianthraquinonyl compound ranges from about 1 to about 15% by weight based on the weight of the aqueous suspension.

10. A process according to claim 1, wherein said inorganic alkali is present in an amount of 2 to 10% by weight based on the weight of water in the aqueous suspension.

11. A process according to claim 1, wherein said inorganic alkali is present in an amount of 1 to 20% by weight based on the weight of water in the aqueous suspension.

12. A process according to claim 11, wherein the inorganic alkali is sodium hydroxide or potassium hydroxide.

* * * * *